(12) United States Patent
Kawamura et al.

(10) Patent No.: US 7,111,511 B2
(45) Date of Patent: Sep. 26, 2006

(54) ANGULAR RATE SENSOR (75) Inventors: Toshiyuki Kawamura, Miyagi (JP); Toru Matsunaga, Miyagi (JP); Kazuo Kurihara, Saitama (JP); Shigeto Watanabe, Miyagi (JP); Yoshinori Satoh, Saitama (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/942,155

(22) Filed: Sep. 16, 2004

(65) Prior Publication Data
US 2005/0097954 A1 May 12, 2005

(30) Foreign Application Priority Data
Oct. 3, 2003 (JP) ............................ P2003-346111

(51) Int. Cl.
G01C 19/00 (2006.01)
G01P 9/04 (2006.01)

(52) U.S. Cl. ................... 73/504.12; 73/504.14
(58) Field of Classification Search ............. 73/504.02, 73/504.04, 504.12, 504.14, 504.15, 504.16; 310/311, 324–325, 331, 365–371
See application file for complete search history.

(56) References Cited

U.S. PATENT DOCUMENTS 5,765,046 A * 6/1998 Watanabe et al. ............. 396/53
6,477,897 B1 * 11/2002 Mori ......................... 73/504.12
2005/0115318 A1 * 6/2005 Kawamura et al. ........ 73/504.12
2005/0146618 A1 * 7/2005 Matsunaga et al. ........ 348/208.1
2005/0188766 A1 * 9/2005 Matsunaga et al. ........ 73/504.14

FOREIGN PATENT DOCUMENTS

| JP | 9-304081 | * 11/1997 |
| JP | 10-47968 | * 2/1998 |
| JP | 11-83495 | * 3/1999 |

* cited by examiner

Primary Examiner—Helen Kwok
(74) Attorney, Agent, or Firm—Sonnenschein Nath & Rosenthal LLP (57) ABSTRACT

An angular rate sensor includes: a quadratic prism-like oscillator $1a$ formed by laminating a substrate 2 and a piezoelectric material 3; a reference electrode $3a$ which is formed on one main surface 3A of two opposed surfaces of the piezoelectric material 3, the one main surface 3A being bonded to the substrate 2, and which is connected to a reference potential; at least one drive electrode $3b$ which is formed on the other main surface 3B of the two opposed surfaces of the piezoelectric material 3 in the longitudinal direction of the oscillator $1a$, and to which a signal for oscillating the oscillator $1a$ is supplied; and at least a pair of detection electrodes $3c_1$ and $3c_2$ which are formed, in parallel with each other, on the other main surface 3B of the two opposed surfaces of the piezoelectric material 3 in a manner to sandwich the drive electrode $3b$, and which output a signal corresponding to Coriolis force generated in the oscillator $1a$.

4 Claims, 9 Drawing Sheets

ANGULAR RATE SENSOR

RELATED APPLICATION DATA

The present application claims priority to Japanese Application(s) No(s). P2003-346111 filed Oct. 3, 2003, which application(s) is/are incorporated herein by reference to the extent permitted by law.

BACKGROUND OF THE INVENTION

1. Field of the Invention

The present invention relates to an angular rate sensor used for detecting e.g., video camera shake, the operation of a virtual reality apparatus, the direction in a car navigation system or the like.

2. Description of the Related Art

A so-called oscillation gyro type angular rate sensor has been widely available as consumer use. The oscillation gyro type angular rate sensor detects angular rate by oscillating a rod-like oscillator at a predetermined resonance frequency and detecting Coriolis force generated by influence of angular rate with a piezoelectric element or the like.

For driving an oscillator in the angular rate sensor like this, a method using a separately-excited oscillation type driving circuit and one using a self-excited oscillation type driving circuit are available. However, the method using a separately-excited oscillation type driving circuit has a problem that when a difference is made between oscillation frequency and resonance frequency of an oscillator due to influence of temperature characteristics of the oscillator or the like, sensitivity for detecting Coriolis force rapidly decreases. Therefore, the method using a separately-excited oscillation type driving circuit has not been in practical use.

Consequently, the method using a self-excited oscillation type driving circuit in which the oscillator is incorporated in a loop of a phase-shift oscillator circuit is now widely used. Since the angular rate sensor using this method self-oscillates at the resonance frequency of oscillator, sensitivity thereof hardly changes due to influence of the temperature characteristics, thereby obtaining an angular rate output having stable sensitivity in a wide temperature range (refer, for example, to Jpn. Pat. Appln. Laid-pen Publication No. 2000-131077).

Figure 1A:
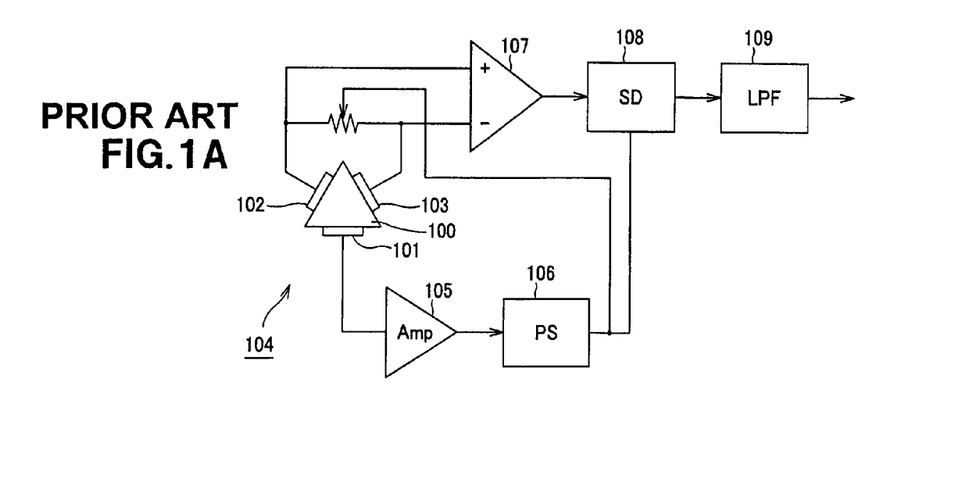
FIGS. 1A to 1C are views of an example of a conventional angular rate sensor, FIG. 1A being a view showing the entire configuration of the angular rate sensor, FIG. 1B being a perspective view showing a part of an oscillator, and FIG. 1C being a cross-sectional view showing the cross section in the central part of the oscillator.
Figure 1B:
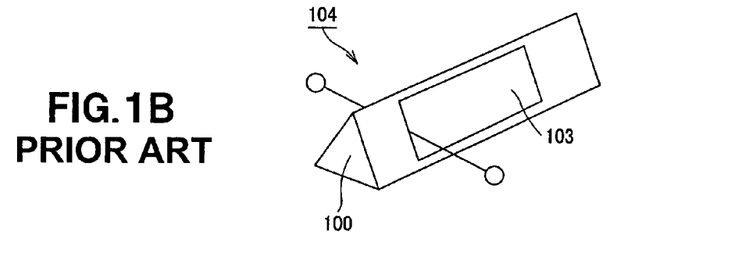
Figure 1C:
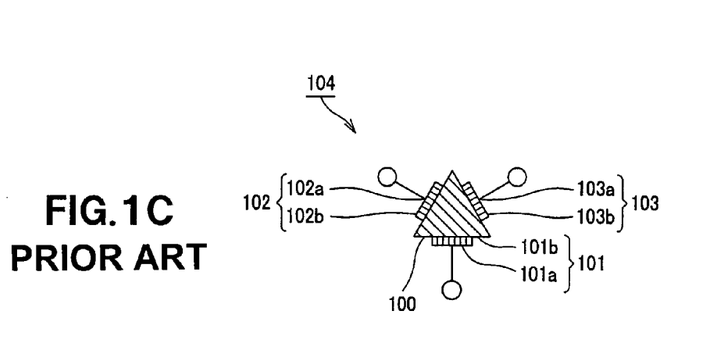

A conventional angular rate sensor shown in FIGS. 1A, 1B, and 1C includes a triangular prism-like oscillator 104 having a triangular prism-like constant elastic oscillator 100. The constant elastic oscillator 100 has first to third piezoelectric elements 101 to 103 attached to the side surfaces thereof, respectively. The first piezoelectric element 101 is composed of an electrode 101a and a piezoelectric material 101b. The second piezoelectric element 102 is composed of an electrode 102a and a piezoelectric material 102b. The third piezoelectric element 103 is composed of an electrode 103a and a piezoelectric material 103b. For example, the constant elastic oscillator 100 is a constant elastic metal oscillator.

The conventional angular rate sensor includes an amplifier 105 connected to the first piezoelectric element 101, a phase shifter 106 connected to the amplifier 105, a differential amplifier 107 connected to the second and third piezoelectric elements 102 and 103, a synchronous detector 108 connected to the differential amplifier 107, and a low-pass filter 109 connected to the synchronous detector 108. In the conventional angular rate sensor, the second and third piezoelectric elements 102 and 103 detect oscillation of the oscillator 104 for performing self-excited oscillation as well as Coriolis force generated in the oscillator 104.

The angular rate sensor using the triangular prism-like oscillator 104 has the highest sensitivity at the present time and therefore is currently mainstream. However, the angular rate sensor of this type has a complicated structure, which makes it difficult to produce high volume efficiency in manufacturing process. For example, in the above configuration, process of bonding piezoelectric elements to each of the triangular prism-like constant elastic oscillators is required, with the result that volume efficiency cannot be improved. Further, along with the miniaturization of the sensor, accuracy in a support mechanism or bonding accuracy of the piezoelectric element to the constant elastic metal oscillator has been increasingly demanded. In addition, influence of a bonding layer to the oscillator is increased. Therefore, manufacturing efficiency is lowered and manufacturing cost is significantly increased.

Figure 2A:
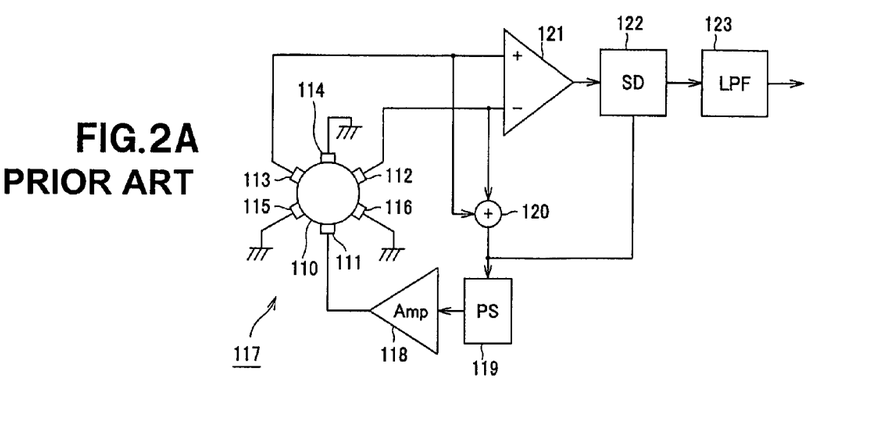
FIG. 2A to 2C are views of another example of a conventional angular rate sensor, FIG. 2A being a view showing the entire configuration of the angular rate sensor, FIG. 2B being a perspective view showing a part of an oscillator, and FIG. 2C being a cross-sectional view showing the cross section in the central part of the oscillator.
Figure 2B:
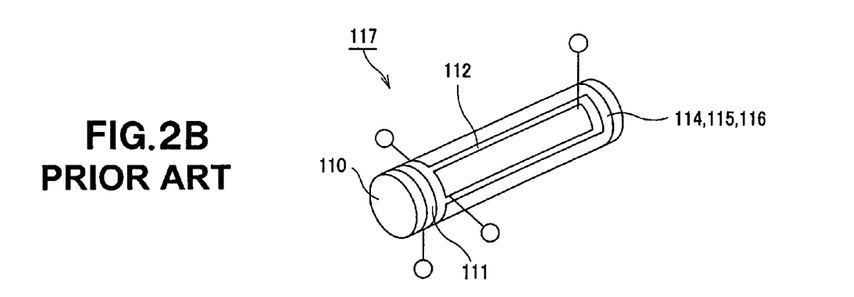
Figure 2C:
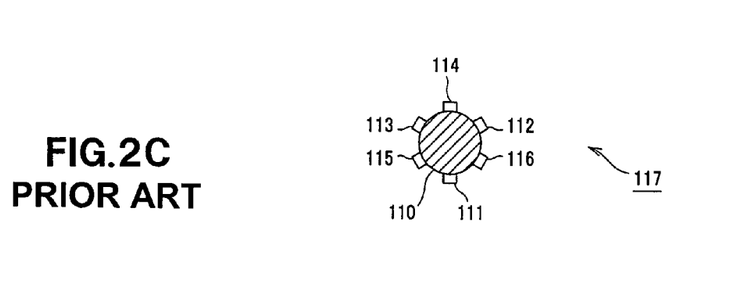

Another conventional angular rate sensor shown in FIGS. 2A, 2B and 2C includes an oscillator 117 having a columnar piezoelectric ceramic oscillator 110. The piezoelectric ceramic oscillator 110 has six electrodes 111 to 116 printed on a side surface thereof. The first to third electrodes 111 to 113 are independently formed. The fourth to sixth electrodes 114 to 116 are connected to the same ground potential. This angular rate sensor includes an amplifier 118 connected to the first electrode 111, a phase shifter 119 connected to the amplifier 118, an adder 120 connected to the phase shifter 119, a differential amplifier 121 connected to the second and third electrodes 112 and 113, a synchronous detector 122 connected to the differential amplifier 121, and a low-pass filter 123 connected to the synchronous detector 122. This angular rate sensor applies a voltage to the first electrode 111 to oscillate the oscillator 117, and detects Coriolis force generated in the oscillator 117 with the second and third electrodes 112 and 113.

In this conventional angular rate sensor, the electrodes 111 to 116 are printed on the oscillator 117 as described above. This eliminates the need to bond the piezoelectric elements to the oscillator 117 and makes the structure of the sensor relatively simple. However, in the case where the sensor size is reduced, it is difficult to produce an accurately configured piezoelectric ceramic oscillator 110 and, it is also difficult to print the electrodes onto the piezoelectric ceramic oscillator 110 with high accuracy.

That is, while this conventional angular rate sensor uses the columnar piezoelectric ceramic oscillator 110, it is difficult to manufacture, with high accuracy, the columnar piezoelectric ceramic oscillator 110 as compared to the triangular prism-like or quadratic prism like oscillator. Further, it is not easy to print with high accuracy the electrodes onto the rounded surface of this angular rate sensor. As described above, the use of the columnar piezoelectric ceramic oscillator 110 makes it difficult to produce the angular rate sensor in large volume. Even though the mass-production has been realized, it is difficult to reduce manufacturing cost.

Figure 3:
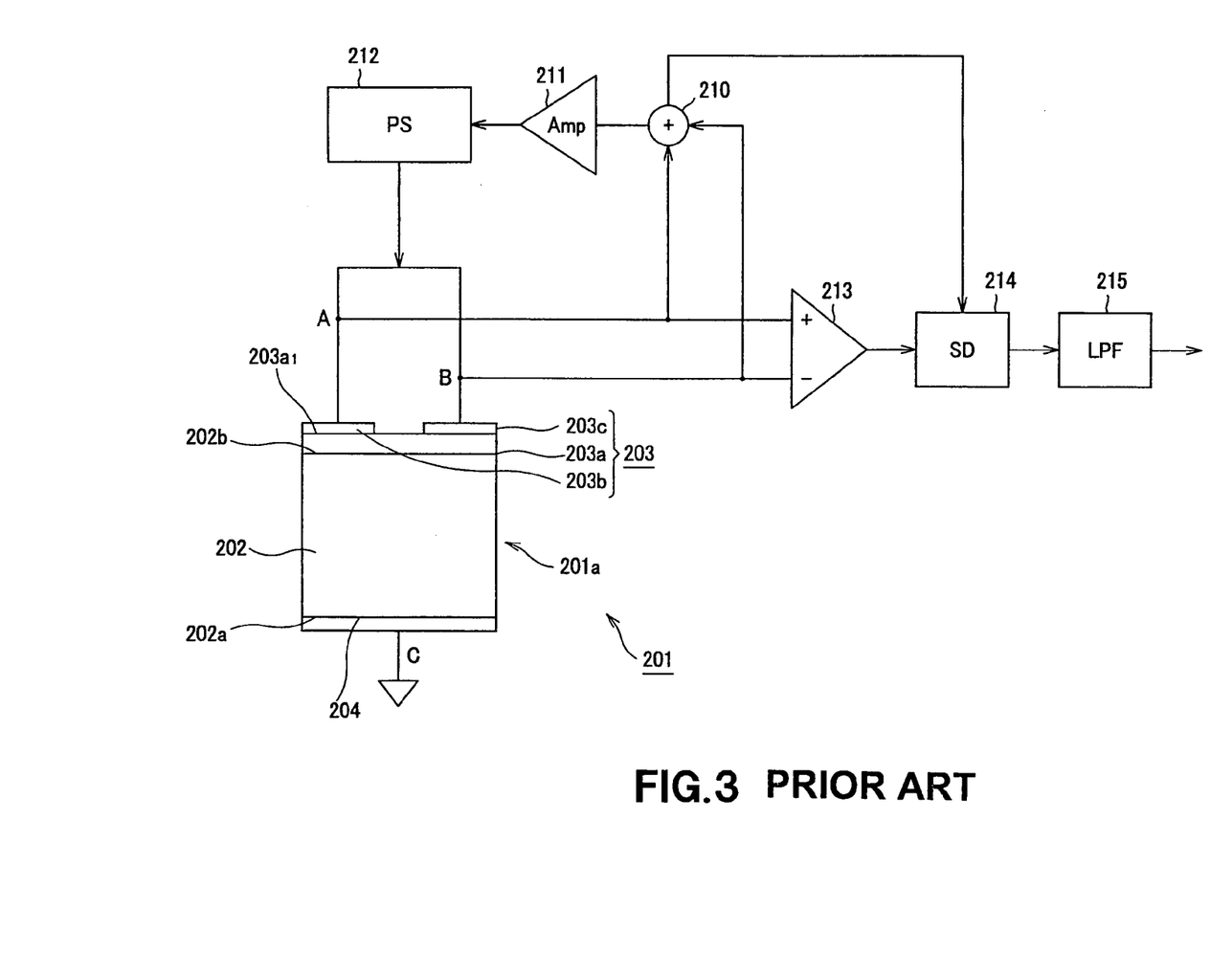
FIG. 3 is a view showing the entire configuration of still another example of a conventional angular rate sensor.

Still another conventional angular rate sensor 201 shown in FIG. 3 includes: a quadratic prism-like oscillator 201a; an electrode 204 formed on a side surface 202a of a ferrite section 202; and a piezoelectric element 203. The quadratic prism-like oscillator 201a is formed by laminating the ferrite section 202 and a piezoelectric ceramic section 203a which is a piezoelectric material. The piezoelectric element 203, which faces the electrode 204 across the oscillator 201a, is constituted by electrodes 203b and 203c disposed on a side surface 203a1 of the piezoelectric ceramic section 203a and the piezoelectric ceramic section 203a. The angular rate sensor 201 applies a voltage between the electrode 204 and electrodes 203b and 203c to allow the piezoelectric element 203 to oscillate the oscillator 201a. Further, the angular rate sensor 201 includes an adder 210, an amplifier 211, and a phase-shifter 212. These components 210 to 212 and electrodes 203b and 203c of the piezoelectric element 203 function as an oscillation drive section for oscillating the oscillator 201a. Further, the angular rate sensor 201 includes a differential amplifier 213, a synchronous detector 214 connected to the output of the adder 210, and a low-pass filter 215. These components 213 to 215 and outside electrodes 203b and 203c of the piezoelectric element 203 function as a detection section for detecting oscillation of the ferrite section 202. That is, the piezoelectric element 203 of the angular rate sensor 201 has a function of driving oscillation as well as a function of detecting the oscillation. With the above configuration, the angular rate sensor 201 detects Coriolis force generated in the oscillator 201a with the piezoelectric element 203, thereby detecting angular rate.

It is only necessary to provide a piezoelectric element only on one surface in this angular rate sensor, which makes the structure thereof relatively simple. However, in this conventional angular rate sensor, electrodes function as drive electrodes as well as detection electrodes. It follows that, when driving efficiency is adjusted to a desired value according to the shape or size of the drive electrode, detection efficiency also changes. Thus, it is difficult to adjust the driving and detection efficiency to desired values at the same time.

That is, the conventional angular rate sensor shown in FIGS. 1A, 1B and 1C has a complicated structure due to the need of bonding the piezoelectric element to the constant elastic metal oscillator, and a complicated oscillator support mechanism. The conventional angular rate sensor shown in FIGS. 2A, 2B and 2C uses the columnar piezoelectric ceramic oscillator, which makes it difficult to manufacture the oscillator with high accuracy. Further, it is not easy to print electrodes onto the curved surface accurately.

SUMMARY OF THE INVENTION

The present invention has been made in view of the above situation, and an object thereof is to provide an angular rate sensor excellent in detection sensitivity, capable of producing high volume efficiency in manufacturing process with a simple structure, and having relatively satisfactory dimensional accuracy of the oscillator that determines essential characteristics of the angular rate sensor.

An angular rate sensor according to the present invention comprises: a quadratic prism-like oscillator formed by laminating a substrate and a piezoelectric material; a reference electrode which is formed on one main surface of two opposed surfaces of the piezoelectric material, the one main surface being bonded to the substrate, and which is connected to a reference potential; at least one drive electrode which is formed on the other main surface of the two opposed surfaces of the piezoelectric material in the longitudinal direction of the oscillator, and to which a signal for oscillating the oscillator is supplied; and at least a pair of detection electrodes which are formed, in parallel with each other, on the other main surface of the two opposed surfaces of the piezoelectric material in a manner to sandwich the drive electrode, and which output a signal corresponding to Coriolis force generated in the oscillator, wherein a voltage is applied between the drive electrode and reference electrode to allow the piezoelectric material to oscillate the oscillator, Coriolis force generated in the oscillator is detected with the piezoelectric material, and an angular rate detection signal is output, as a signal corresponding to Coriolis force, from the detection electrodes.

It is possible to allow the angular rate sensor to further include an electrode which is formed on the two main surfaces of the substrate that faces the main surface of the piezoelectric material and at least one side surface extending from the two main surfaces, and between which and the reference electrode, electrical continuity is established.

In the angular rate sensor, dimensions of the driving electrode and detection electrodes in the width direction of the oscillator are made different from each other.

Further, assuming that W1 is the width of the drive electrode, and W2 is the width of the detection electrodes, the ratio between W1 and W2 falls in a range more than 1 nor more than 2.6 ($1<W1/W2 \leq 2.6$). Preferably, the ratio between W1 and W2 falls in a range more than 1.8 nor more than 2.0 ($1.8<W1/W2 \leq 2.0$).

In the angular rate sensor according to the present invention, a voltage is applied between a reference electrode and driving electrode, the reference electrode being formed on one main surface of two opposed surfaces of the piezoelectric material, the one main surface being bonded to the substrate, and the driving electrode being formed on the other main surface of the two opposed surfaces of the piezoelectric material in the longitudinal direction of the oscillator, to allow the piezoelectric material to oscillate the oscillator, and Coriolis force generated in the oscillator is then detected with the piezoelectric material, thereby outputting an angular rate detection signal, as a signal corresponding to Coriolis force, from a pair of detection electrodes which are formed, in parallel with each other, on the other main surface of the two opposed surfaces of the piezoelectric material in a manner to sandwich the drive electrode.

In the angular rate sensor, the oscillator disposed between the opposed electrodes includes the substrate having a predetermined mass. Therefore, Coriolis force can be effectively detected. Further, since electrical continuity is established between the opposed electrodes of the substrate, a driving electric field for driving the oscillator can be effectively applied to the piezoelectric part.

The angular rate sensor includes a quadratic prism-like oscillator formed by laminating a substrate and a piezoelectric material, and electrodes disposed on respective main surfaces of the substrate and piezoelectric material, which are opposed to each other, of the oscillator. This configuration eliminates difficult process, such as bonding a piezoelectric material to a constant elastic metal oscillator, or printing electrodes onto a curved surface. Further, merely by performing simple process of: applying electrode coating to a wafer such as a piezoelectric ceramic which serves as a base body of the piezoelectric material and another wafer which serves as a base body of the substrate to form electrodes; bonding the base bodies to each other; and cutting out separately the resultant body as a quadratic prism-like oscillator, the highly accurate oscillator can be manufactured. Further, driving efficiency and detection efficiency can be individually adjusted, so that desired sensitivity characteristics can be obtained.

In the present invention, dimensions of the driving electrode, which is disposed on the main surface of the piezoelectric material and which drives the oscillator, and detection electrodes for detecting Coriolis force generated in the oscillator, in the width direction of the oscillator are made different from each other, to realize a highly accurate angular rate sensor.

The angular rate sensor according to the present invention has a very simple structure obtained by laminating the piezoelectric material and substrate, and thereby does not lose accuracy even when the size thereof is reduced. Therefore, it is possible to obtain high-cost performance. That is, it is possible to obtain the configuration having a potential for producing high volume efficiency.

DETAILED DESCRIPTION OF THE PREFERRED EMBODIMENTS

An embodiment of the present invention will be described below in detail with reference to the accompanying drawings. The present invention is not limited to the following examples, and can be variously modified without departing from the spirit and scope of the invention.

Figure 4:
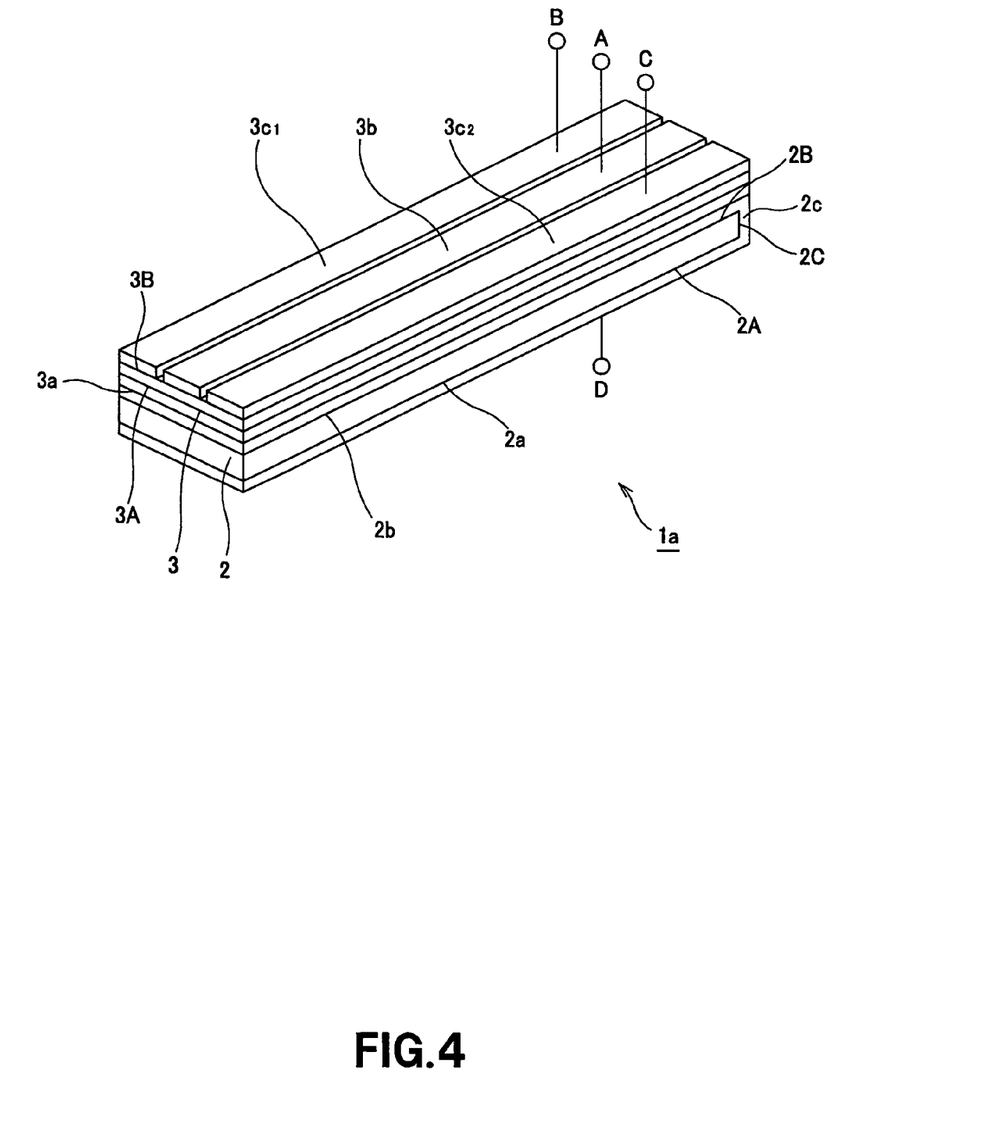
FIG. 4 is a perspective view showing an oscillator provided in an angular rate sensor to which the present invention is applied.
Figure 5:
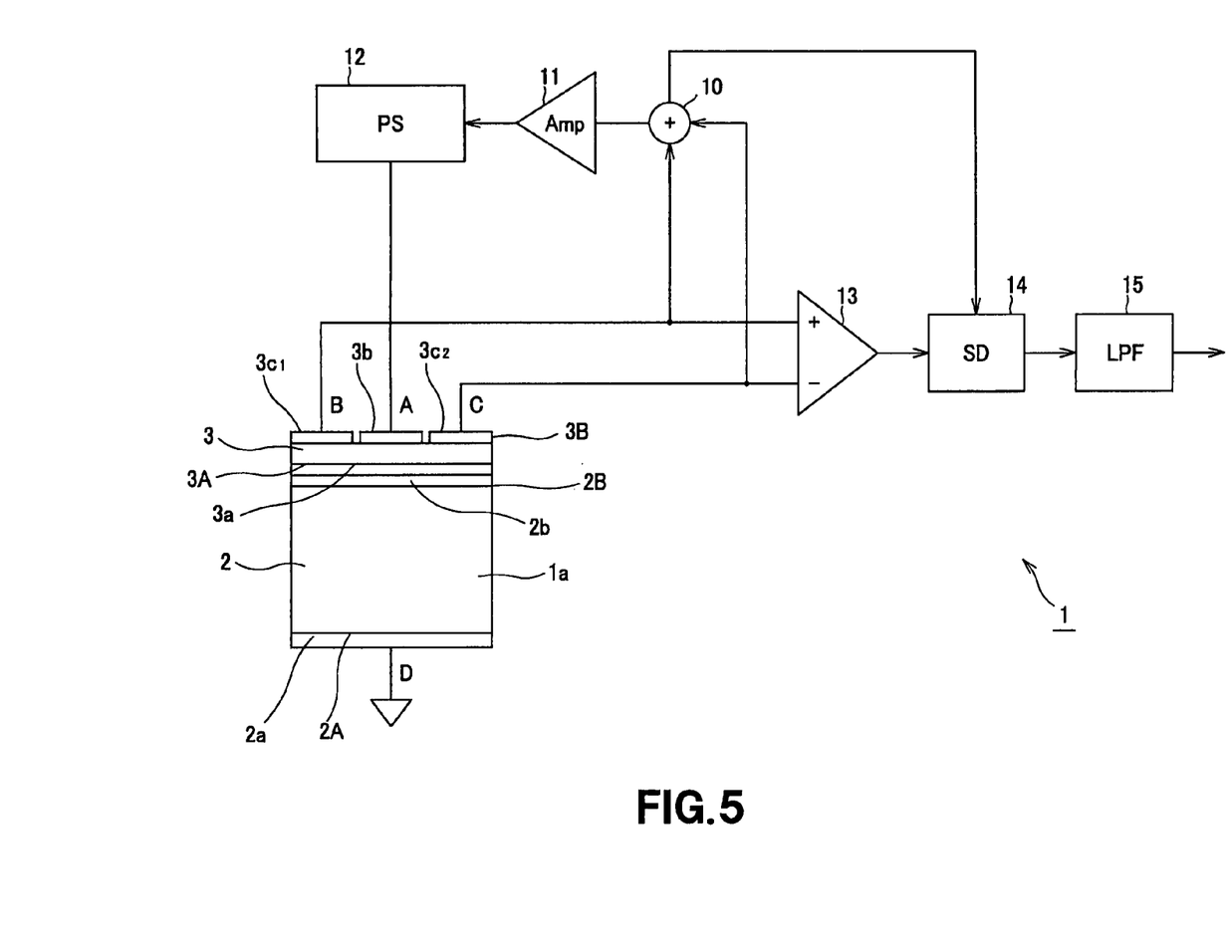
FIG. 5 is a block diagram showing an example of a circuit for realizing the angular rate sensor.

FIG. 4 is a perspective view showing an oscillator 1a provided in an angular rate sensor 1 to which the present invention is applied. FIG. 5 is a block diagram showing an example of a circuit for realizing the angular rate sensor 1.

The angular rate sensor 1 according to the present embodiment includes, as shown in FIGS. 4 and 5, the oscillator 1a acting as an oscillation gyro.

The oscillator 1a is formed by laminating a substrate 2 and a piezoelectric material 3 and formed into a quadratic prism-like shape having a rectangular cross section when the oscillator is cut with a plane perpendicular to the longitudinal direction thereof. The substrate 2 of the oscillator 1a is made of e.g., amorphous carbon.

The piezoelectric material 3 is made of a piezoelectric ceramic such as a Lead Zirconate Titanate (PZT), or a piezoelectric single crystal such as a crystal or $LiTaO_3$. The piezoelectric material 3 is obtained through polarization process, in general.

The piezoelectric material 3 has one main surface 3A to be bonded to the substrate 2 and the other main surface 3B which are opposed to each other. A reference electrode 3a is formed on the main surface 3A. Further, a drive electrode 3b and a pair of detection electrodes $3c_1$, $3c_2$ are formed separately to, and in parallel with each other along the longitudinal direction of the oscillator 1a in a manner that the drive electrode 3b is sandwiched between the detection electrodes $3c_1$, $3c_2$.

In the angular rate sensor 1, the thickness of the piezoelectric material 3 is smaller than that of the substrate 2. Here, for example, the piezoelectric material has a thickness of 0.2 mm, and the substrate has a thickness of 0.8 mm.

The angular rate sensor 1 applies a voltage between the reference electrode 3a formed on the one main surface 3A of the piezoelectric material 3 included in the oscillator 1a formed by laminating the substrate 2 and piezoelectric material 3 and the drive electrode 3b formed on the other main surface 3B opposed to the main surface 3A to oscillate the oscillator 1a, detects Coriolis force generated in the oscillator 1a with the piezoelectric material 3, and outputs from the detection electrodes $3c_1$ and $3c_2$ formed on the other main surface 3B an angular rate detection signal that corresponds to the detected Coriolis force.

In the angular rate sensor 1 according to the present embodiment, electrodes 2a, 2b and 2c between which the electrical continuity is established are formed on the two main surfaces 2A and 2B of the substrate 2 that faces the main surface of the piezoelectric material 3 and at least one side surface 2C extending from the two main surfaces 2A and 2B. The electrical continuity between the electrodes 2a, 2b, 2c and reference electrode 3a is established by connecting the electrode 2b to the reference electrode 3a, thereby constituting the oscillator 1a in which the substrate 2 and piezoelectric material 3 are laminated. Note that it is possible to form the electrode by coating a conductive material on all surfaces of the substrate 2.

Terminals A, B and C are derived from the drive electrode 3b formed on the other main surface 3B of the piezoelectric material 3, and the pair of detection electrodes $3c_1$ and $3c_2$, respectively in the angular rate sensor 1. A terminal D is derived from an electrode 2a formed on the main surface 2A of the substrate 2, the electrode 2a being electrically connected to the reference electrode 3a formed on the main surface 3A of the piezoelectric material 3.

The piezoelectric material 3 of the angular rate sensor 1 has a function of driving oscillation as well as a function of detecting the oscillation. With the above configuration, the angular rate sensor 1 detects, with the detection function, Coriolis force generated by the rotation of the oscillator 1a while the angular rate sensor 1 oscillates with the oscillation drive function.

In the angular rate sensor 1, as shown in FIG. 5, the adder 10 and differential amplifier 13 are connected respectively to the terminals B and C derived from the pair of detection electrodes $3c_1$ and $3c_2$. The sum output of the adder 10 is amplified by the amplifier 11 and supplied to the phase shifter 12. The output terminal of the phase shifter 12 is connected to the terminal A derived from the drive electrode 3b. This configuration functions as the oscillation drive section for oscillating the oscillator 1a. Note that the terminal D derived from the electrode 2a formed on the main surface 2A of the substrate 2, the electrode 2a being electrically connected to the reference electrode 3a formed on the one main surface 3A of the piezoelectric material 3, is connected to a reference voltage terminal having a predetermined potential.

The adder 10, amplifier 11, phase shifter 12, and oscillator 1a constitute a so-called phase-shift oscillator circuit. With the phase-shift oscillator circuit, the oscillator 1a is self-oscillated. The oscillation direction of the oscillator 1a is perpendicular to the main surface 3B of the piezoelectric material 3 provided with the drive electrode 3b. This direction is hereinafter referred to as merely "oscillation direction".

The output terminals of the adder 10 and differential amplifier 13 connected to the terminals B and C derived from the pair of detection electrodes $3c_1$ and $3c_2$ are connected to the synchronous detector 14, which is connected to the low-pass filter 15. These components and the piezoelectric material 3 function as the detection section for detecting the rotation of the oscillator 1a.

That is, while the oscillator 1a oscillates in the oscillation direction, the rotation of the oscillator 1a generates Coriolis force in the oscillator 1a. The angular rate sensor 1 detects the generated Coriolis force with the piezoelectric material 3, outputs it from the detection electrodes $3c_1$ and $3c_2$ as signals having opposite polarity to each other, and inputs the signals to the differential amplifier 13. The output amplified by the differential amplifier 13 is input to the synchronous detector 14, where synchronous detection is performed. At this time, the output from the adder 10 is supplied to the synchronous detector 14 as a synchronous signal for the synchronous detection to be performed. The signal from the synchronous detector 14 is passed through the low-pass filter 15, and is then output as an angular rate signal obtained by detecting Coriolis force generated in the oscillator 1a.

As described above, in the angular rate sensor 1, the piezoelectric material 3 is used to oscillate the oscillator 1a, and Coriolis force generated in the oscillator 1a at this time is detected with the piezoelectric material 3. Angular rate can thus be detected based on Coriolis force detected by the piezoelectric material 3.

Figure 6A:
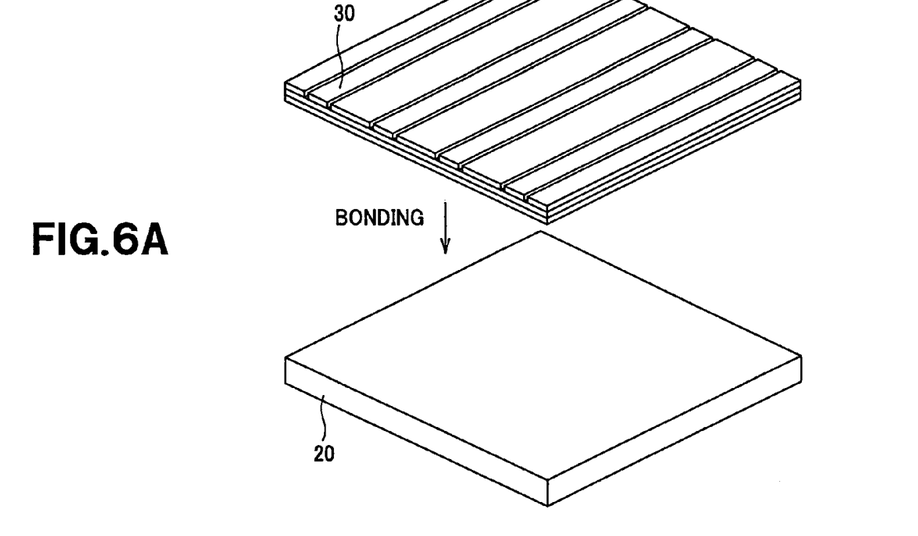
FIGS. 6A, 6B and 6C show an example of a method for manufacturing the angular rate sensor.
Figure 6B:
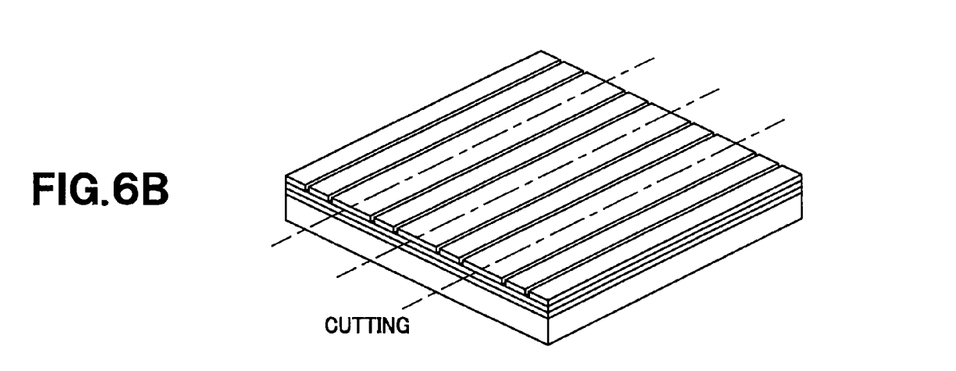
Figure 6C:
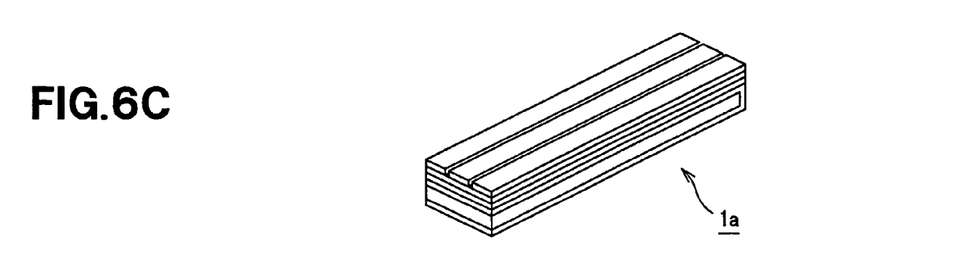

In the angular rate sensor 1 having the above configuration, the detection electrodes $3c_1$ and $3c_2$, and drive electrode 3b are disposed on the same plane. Therefore, it is possible to manufacture the oscillator 1a by the following process. That is, a wafer 20, which is a base body of the substrate, on all the surfaces of which the electrode is formed by coating a conductive material, and a wafer 30, which is a base body of the piezoelectric material, on which electrodes are formed by applying double-sided electrode coating are laminated and bonded to each other, as shown in FIG. 6A, followed by being cut out separately as a quadratic prism, as shown in FIG. 6B, thereby obtaining the oscillator 1a as shown in FIG. 6C. The oscillator 1a manufactured in the above process shows high accuracy, and the size thereof can be extremely reduced. Further, this configuration makes it possible to produce high volume efficiency in manufacturing process. The problem of bond displacement of the piezoelectric material can also be solved. Since the substrate and piezoelectric material has substantially the same cutting workability, the oscillator can be easily cut out from laminated wafers of the substrate and piezoelectric material.

Further, the above configuration eliminates difficult process, such as bonding a piezoelectric material to a constant elastic metal oscillator, or printing electrodes onto a curved surface.

In the angular rate sensor 1, the reference electrode 3a is formed on the one main surface 3A of the piezoelectric material 3, which is to be bonded to the material 2. On that basis, a conductive material is coated on the substrate 2 to form electrodes 2a, 2b and 2c electrically connected to the reference electrode 3a on the two main surfaces 2A and 2B of the substrate 2 that faces the main surface 3A of the piezoelectric material 3 and at least one side surface 2C extending from the two main surfaces 2A and 2B. As a result, it is possible to effectively apply a driving electric field to the piezoelectric material 3, thereby increasing sensitivity. Note that a conductive material may be used to form the substrate 2.

It can be considered that miniaturization increases technical difficulty, and makes it difficult to assure sufficient accuracy. However, by applying fine process technology that has been established in the field of LSI or head process, such a problem can be solved. Therefore, manufacturing with high dimensional accuracy can be achieved, thereby simplifying frequency adjustment of the oscillator.

Further, a self-excited oscillation type drive circuit is applied to the angular rate sensor 1 according to the present embodiment to constitute a highly accurate angular rate sensor with a very simple structure.

Since the angular rate sensor 1 is a self-excited oscillation type, sensitivity thereof hardly decreases due to influence of temperature characteristics as in the case of the separately-excited angular rate sensor.

Figure 7:
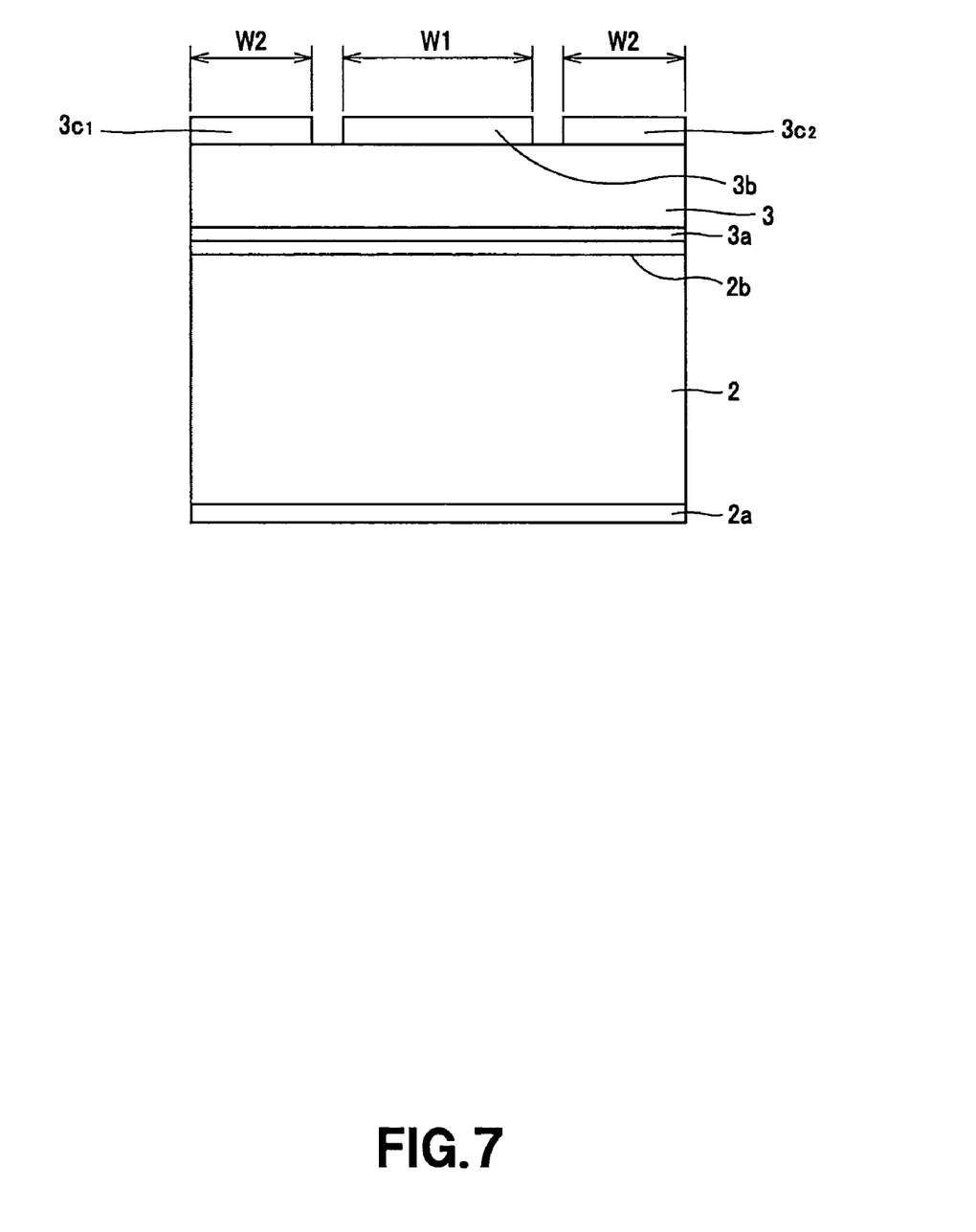
FIG. 7 shows a model showing dimensions of detection electrodes and drive electrode in the width direction of the oscillator, the detection electrodes and drive electrode being formed in the same plane in the angular rate sensor.

Further, when dimensions of the detection electrodes $3c_1$ and $3c_2$, and drive electrode 3b in the width direction of the oscillator 1a are made different from each other, as shown in FIG. 7, detection characteristics of the angular rate sensor 1 can be optimized. That is, when the shape or size of the drive electrode 3b is adjusted, driving efficiency can be adjusted. Further, when the shapes or sizes of the detection electrodes $3c_1$, $3c_2$ are adjusted, detection efficiency can be adjusted.

Figure 8:
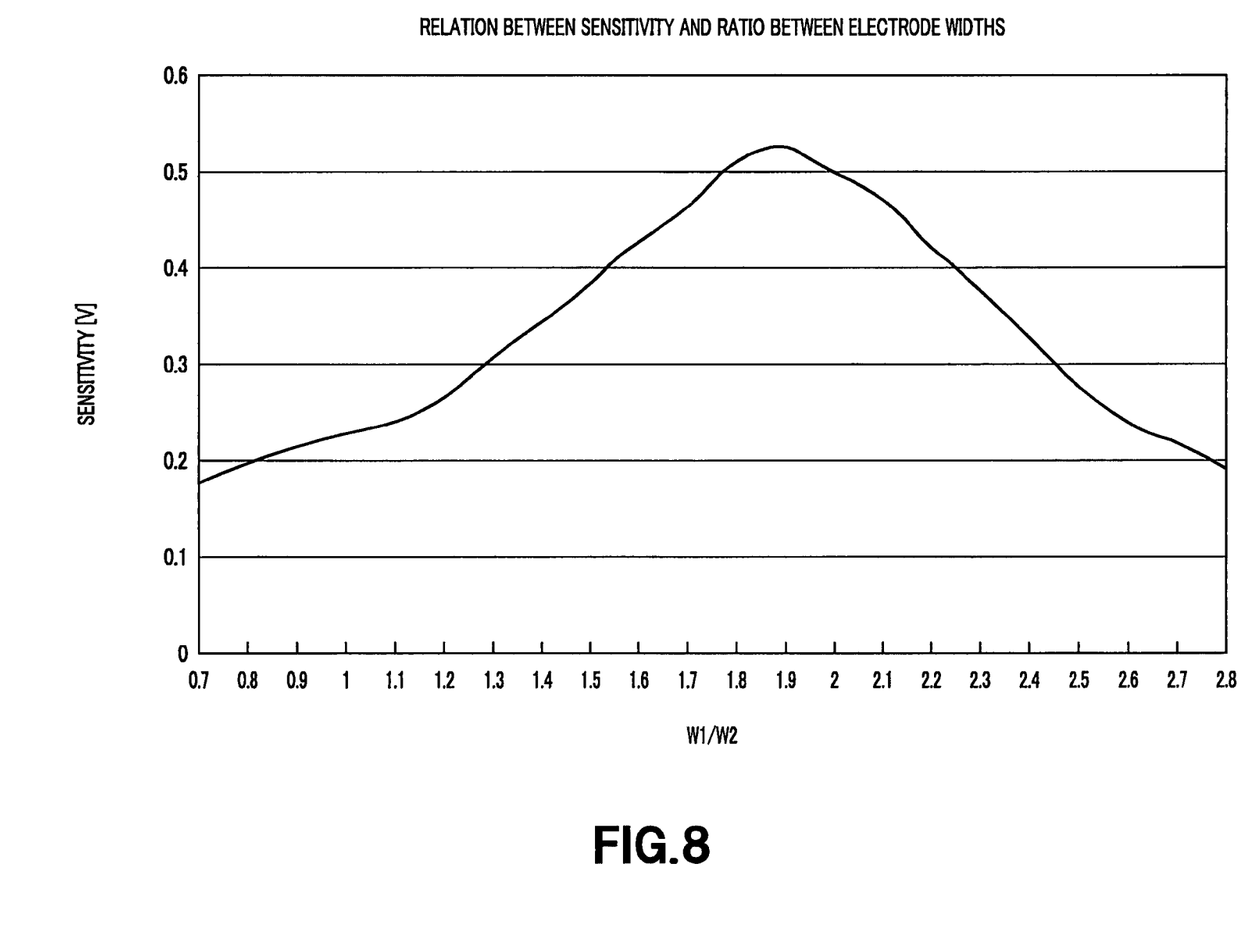
FIG. 8 shows measurement results of the sensitivity in the case where the widths of the drive electrode and detection electrodes are changed in the angular rate sensor.

FIG. 8 shows a measurement result of the sensitivity of the angular rate sensor 1. Here, it is assumed that W1 denotes the width of the drive electrode 3b, W2 denotes the width of the detection electrodes $3c_1$ and $3c_2$, and W1/W2 is changed within a range of 1 to 2.8.

As can be seen from the sensitivity characteristics shown in FIG. 8, when W1/W2 is more than 1 nor more than 2.6 ($1<W1/W2 \leq 2.6$), the angular rate sensor 1 shows the sensitivity comparable to or superior to that in the case of W1/W2=1. In particular, when W1/W2 is more than 1.8 nor more than 2.0 ($1.8<W1/W2 \leq 2.0$), the sensitivity more than double that in the case of W1/W2=1 can be obtained.

Figure 9:
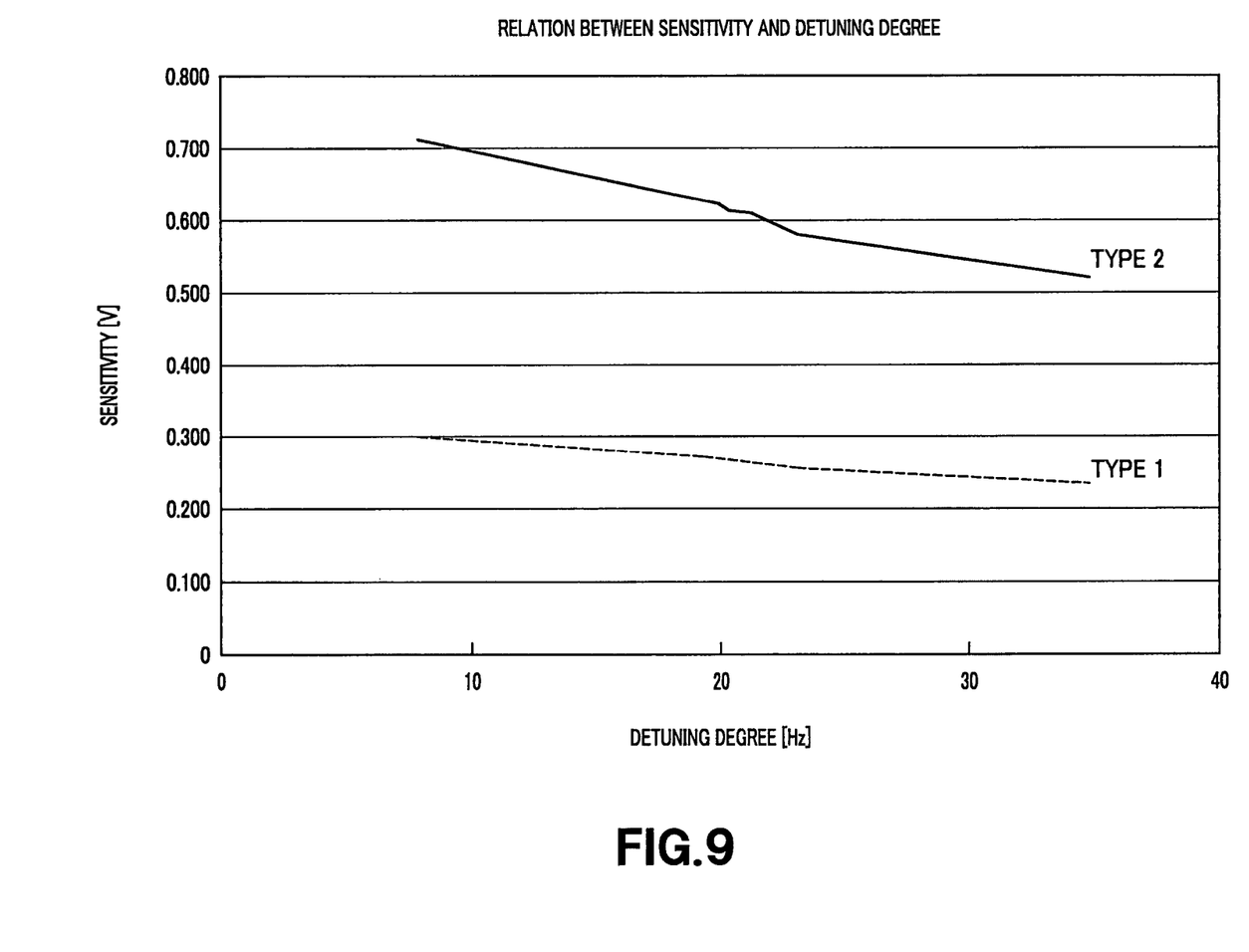
FIG. 9 shows the relation between sensitivity and detuning degree in the case where the widths of the drive electrode and detection electrodes are changed in the angular rate sensor.

FIG. 9 shows the relation between sensitivity and detuning degree.

The detuning degree is a difference between resonance frequencies in the vertical and lateral directions. The smaller the detuning degree, the higher the sensitivity becomes. TYPE1 shows the case of W1/W2=1, and TYPE2 shows the case of W1/W2=1.9. As can be seen from FIG. 9, the sensitivity in the case of W1/W2=1.9 is overwhelmingly higher than that in the case of W1/W2=1, regardless of the values of the detuning degree.

As described above, the angular rate sensor 1 has a very simple structure, and thereby does not lose accuracy even when the size thereof is reduced. Therefore, it is possible to obtain high-cost performance and highly-accurate configuration. That is, it is possible to obtain the configuration having a potential for producing high volume efficiency. Further, since the cost and the size of the angular rate sensor 1 can be further reduced and the sensitivity thereof can also farther be increased, it is possible to meet the demands of further size reduction and high cost performance when the angular rate sensor is applied to a video camera, virtual reality device or the like.

It is not always necessary that electrodes are formed on the substrate 2 by coating a conductive material, as in the case of the present embodiment, as long as the material itself of the substrate 2 has conducting properties. Since Coriolis force becomes larger in proportion to the weight (mass) of the oscillator 1a, sensor sensitivity is increased with larger mass of the substrate 2. The material of the substrate 2 may be selected with such a fact taken into consideration.

What is claimed is:

1. An angular rate sensor comprising:
   a quadratic prism-like oscillator comprising a substrate and a piezoelectric material;
   a reference electrode on one of two main oppositely facing surfaces of the piezoelectric material, the one of two main surfaces of the piezoelectric material bonded to one of two main oppositely facing surfaces of the substrate, and the reference electrode is connected to a reference potential;
   at least one drive electrode on the other main surface of the two oppositely facing surfaces of the piezoelectric material in a longitudinal direction of the oscillator, and to which a signal for oscillating the oscillator is supplied;
   at least a pair of detection electrodes, in parallel with each other, on the other main surface of the two main oppositely facing surfaces of the piezoelectric material in a manner to sandwich the at least one drive electrode, and which output a signal corresponding to a Coriolis force generated in the oscillator; and
   an electrode on the two main oppositely facing surfaces of the substrate and on at least one side surface of the substrate extending from the two main oppositely facing surfaces of the substrate, and between the electrode and the reference electrode electrical continuity is established,
   wherein
   a voltage is applied between the drive electrode and the reference electrode to allow the piezoelectric material to oscillate the oscillator, the Coriolis force generated in the oscillator is detected with the piezoelectric material, and
   an angular rate detection signal is output, as a signal corresponding to the Coriolis force, from the detection electrodes.

2. The angular rate sensor according to claim 1, wherein dimensions of the at least one drive electrode and detection electrodes in a width direction of the oscillator are made different from each other.

3. The angular rate sensor according to claim 2, wherein assuming that W1 is the width of the drive electrode, and W2 is the width of the detection electrodes, the ratio between W1 and W2 falls in a range more than 1 nor more than 2.6 ($1 < W1/W2 \leqq 2.6$).

4. The angular rate sensor according to claim 2, wherein assuming that W1 is the width of the drive electrode, and W2 is the width of the detection electrodes, the ratio between W1 and W2 falls in a range more than 1.8 nor more than 2.0 ($1.8 < W1/W2 \leqq 2.0$).

* * * * *